(No Model.)
E. WESTON.
GALVANIC BATTERY.
No. 310,004.  Patented Dec. 30, 1884.
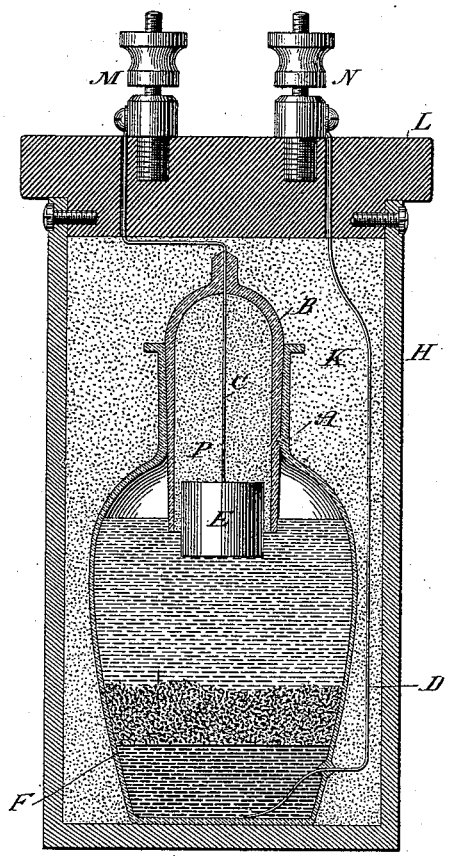
Attest:
Raymond F. Barnes.
H. Frisby.
Inventor:
Edward Weston
By Parker W. Page,
Atty.

UNITED STATES PATENT OFFICE.

EDWARD WESTON, OF NEWARK, NEW JERSEY.

GALVANIC BATTERY.

SPECIFICATION forming part of Letters Patent No. 310,004, dated December 30, 1884.

Application filed May 17, 1884. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Galvanic Batteries, of which the following is a specification, reference being had to the drawing accompanying and forming a part of the same.

The object of my present invention is to produce a battery which shall have a practically constant electro-motive force, and which shall maintain a uniform difference of potential between its poles. Batteries of this kind have been used in the art for testing purposes and known as "standard cells." These cells are designed for use as a standard of electro-motive force with which other batteries or sources of electrical potential may be compared by the employment of suitable instruments. It is not required of them, therefore, that they should be capable of producing a constant current for any length of time, nor that they should generate a current of any considerable strength; but it is highly important that they should maintain for a long period the capacity of developing a constant electro-motive force, and that they should be so constructed as to be easily and exactly duplicated. In cells of this kind heretofore constructed these features are attained only in a measure. These cells have contained as a negative element mercury in as pure a state as possible covered by a paste made by boiling mercurous sulphate in a solution of sulphate of zinc supposed to be thoroughly saturated. A piece of pure zinc suspended in this paste formed the positive element. These cells I have found to be unreliable, subject to variations, and difficult to duplicate. This is due to the fact that the solution of sulphate of zinc must necessarily fall short of complete saturation, and therefore its true strength is unknown. The imperfect means of sealing permits of evaporation, and changes of temperature sensibly affect the materials used. To improve this kind of cell, therefore, I use with elements composed, respectively, of pure zinc and pure mercury a neutral solution of sulphate of zinc of known strength containing a given quantity of mercurous sulphate. The cells I make entirely of glass in such manner that they may be hermetically sealed, and the conducting-wires I seal in the glass. The main advantages resulting from this construction are that the action of the solution, of which a relatively large quantity is used, is more even than that of the paste. The strength of the solution is definitely known, so that the cells may be at any time duplicated, and the perfect sealing prevents leakage or evaporation. Cells thus made last for a very long time without sensible alteration.

I will describe more in detail the construction and character of my invention by reference to the accompanying drawing, in which a cell is represented in central vertical section.

A is a glass jar or bottle; B, a stopper in the form of a slightly-conical tube, closed at one end and fitted into the neck of the jar A by grinding. A platinum wire, C, is sealed into the closed end of the stopper B, and a similar wire, D, is sealed into the jar A near its bottom. To the wire C is connected a cylinder of pure zinc, E, the preferred mode of attaching this being to cast or mold the zinc around the end of wire C before the sealing in of the latter. About a third (more or less) of the zinc should project beyond the open end of the stopper B, and there should be a small space between the zinc and the stopper, through which melted paraffine P, or like substance, is introduced until the stopper is completely filled. In the bottom of the jar is placed a quantity of pure metallic mercury, F, into which the wire D should extend sufficiently to make good electrical contact. The jar is filled to a level slightly above the end of the stopper with a neutral solution of sulphate of zinc, not saturated, but of known strength, and into this is placed a given quantity of the crystals of mercurous sulphate, G. When the cell has been thus prepared, it is placed in a small wooden or other case, H, which is then filled up with melted paraffine or the like, (designated by K.) The wires C D are brought up through this and through a lid or cover, L, secured to the case, and are connected to binding-posts M N. In action the zinc is attacked by the solution and metallic mercury deposited, the reverse reaction taking place when the cell is out of circuit, the reactions being similar in this respect to those in batteries containing the same elements. In using these cells it is not customary to connect them in circuits of low resistance, but to use one or more of them on circuits of very high resistance, or with condensers. As they are intended as a standard by which other sources of potential may be compared, it is essential that their capacity for developing electro-motive force should be practically the same at all times. This is possible with the cells made as described. The ability to duplicate the cells is also essential. This is attained by using chemically-pure materials and a solution of known strength.

What I claim as my invention is—

1. In a standard voltaic cell, the combination, with elements composed of zinc and mercury, respectively, of a solution of sulphate of zinc of a known strength below the point of saturation, as set forth.

2. In a standard voltaic cell, the combination, with elements composed of zinc and mercury, respectively, of a solution of sulphate of zinc of known strength below the point of saturation, and containing mercurous sulphate, as set forth.

3. The combination, with a hermetically-sealed jar composed entirely of glass, of voltaic elements contained within said jar, and conducting-wires passing into the jar and sealed in the glass, as set forth.

4. The combination, with a hermetically-sealed jar composed entirely of glass and surrounded by or embedded in paraffine or a similar substance, of voltaic elements contained within said jar, and conducting-wires passing into the jar and sealed in the glass, as set forth.

5. The combination, with a glass jar containing mercury and a solution of sulphate of zinc, and a conducting-wire entering the jar and sealed therein, of a tubular glass stopper fitted to the jar, a conductor sealed into the same, and a zinc electrode connected to the said wire, as and for the purpose specified.

6. The combination, with the jar A, containing mercury and a sulphate of zinc solution, and wire D, sealed in said jar, of the stopper B, wire C, sealed therein, the zinc E, and filling P.

In testimony whereof I have hereunto set my hand this 15th day of May, 1884.

EDWARD WESTON.

Witnesses:
 JOHN C. YOUNG,
 RICHD. W. BLOEMEKE.